United States Patent
Lin

(10) Patent No.: US 6,920,420 B2
(45) Date of Patent: Jul. 19, 2005

(54) METHOD FOR PROBABILISTIC ERROR-TOLERANT NATURAL LANGUAGE UNDERSTANDING

(75) Inventor: Yi-Chung Lin, Chilung (TW)

(73) Assignee: Industrial Technology Research Institute, Hsinchu (TW)

(*) Notice: Subject to any disclaimer, the term of this patent is extended or adjusted under 35 U.S.C. 154(b) by 727 days.

(21) Appl. No.: 09/790,947

(22) Filed: Feb. 22, 2001

(65) Prior Publication Data

US 2002/0042711 A1 Apr. 11, 2002

(30) Foreign Application Priority Data

Aug. 11, 2000 (TW) .................................. 89116182 A

(51) Int. Cl.[7] .......................... G10L 15/18; G06F 17/20
(52) U.S. Cl. ........................................... 704/9; 704/257
(58) Field of Search ......................... 704/9, 10, 231, 704/236, 240, 251, 255, 257, 270

(56) References Cited

U.S. PATENT DOCUMENTS

| | | | |
|---|---|---|---|
| 5,774,628 A | 6/1998 | Hemphill ................. 704/255 |
| 6,092,042 A | 7/2000 | Iso ........................... 704/240 |
| 6,314,165 B1 | 11/2001 | Junqua et al. ........... 379/88.03 |
| 6,330,530 B1 | 12/2001 | Horiguchi et al. ............. 704/4 |
| 6,374,217 B1 | 4/2002 | Bellegarda ................ 704/240 |
| 6,456,974 B1 | 9/2002 | Baker et al. ............ 704/270.1 |
| 6,519,562 B1 | 2/2003 | Phillips et al. ............. 704/240 |
| 6,631,346 B1 | 10/2003 | Karaorman et al. .......... 704/9 |
| 6,684,185 B1 * | 1/2004 | Junqua et al. ............. 704/243 |
| 6,711,541 B1 * | 3/2004 | Kuhn et al. .............. 704/242 |
| 6,782,357 B1 * | 8/2004 | Goodman et al. ............ 704/9 |
| 6,801,893 B1 * | 10/2004 | Backfried et al. .......... 704/257 |

OTHER PUBLICATIONS

Harper et al. "Interfacing a CDG parser with an HMM word recognizer using word graphs," 1999 IEEE International Conference on Acoustics, Speech, and Signal Processing, 1999, vol. 2, Mar. 15–19 1999, pp. 733 to 736.
N. Chomsky, "Three models for the description of language," IEEE Transactions on Information Theory, vol. 2, Issue 3, Sep. 1956, pp. 113 to 124.
Klaiber et al. "Parallel evaluation of attribute grammars," IEEE Transactions on Parallel and Distributed Systems, vol. 3, Issue 2, Mar. 1992, pp. 206 to 220.

* cited by examiner

Primary Examiner—Martin Lerner
(74) Attorney, Agent, or Firm—J. C. Patents

(57) ABSTRACT

A method of probabilistic error-tolerant natural language understanding. The process of language understanding is divided into a concept parse and a concept sequence comparison steps. The concept parse uses a parse driven by a concept grammar to construct a concept parse forest set by parsing results of speech recognition. The concept sequence comparison uses an error-tolerant interpreter to compare the hypothetical concept sequences included by the concept parse forest set and the exemplary concept sequences included in the database of the system. A most possible concept sequence is found and converted into a semantic framed that expresses the intention of the user. The whole process is led by a probability oriented scoring function. When error occurs in the speech recognition and a correct concept sequence cannot be formed, the position of the error is determined and the error is recovered according to the scoring function to reduce the negative effect.

14 Claims, 8 Drawing Sheets

US 6,920,420 B2

METHOD FOR PROBABILISTIC ERROR-TOLERANT NATURAL LANGUAGE UNDERSTANDING

CROSS-REFERENCE TO RELATED APPLICATION

This application claims the priority benefit of Taiwan application serial no. 89116182, filed Aug. 11, 2000.

BACKGROUND OF THE INVENTION

1. Field of the Invention

The invention relates in general to a method to convert a speech utterance into a concept sequence. More particularly, this invention relates to a method adopting a probabilistic scoring function to determine the positions of speech recognition errors and to recover an incorrect concept sequence into a correct concept sequence when the speech recognition errors result in such incorrect concept sequence.

2. Description of the Related Art

The natural language understanding technique converts the spoken languages of human beings into a data format that a computer can understand, so that the computer provides various services for users in different application. For example, in the application of machine translation, a vulgate can be translated into a foreign language. In addition to text-based applications, the natural language understanding technical can also be used for speech related applications. Commonly, the speech is converted into words, followed by the process of the natural language understanding.

Generally speaking, the speech related application system (such as spoken dialogue system) includes speech recognition module and language understanding module. The speech recognition module converts the utterance spoken by a user into a set of possible word sequences, while the language understanding module analyze the word sequence set to determine the intention of the user. The user's intention is expressed with a semantic frame.

FIG. 1 shows a flow chart for understanding the utterance spoken by a user. For example, assume that the utterance signal in block S100 is produced by pronouncing the Mandarin words "Qing-Wen (tell me) Hsin-Chu (Hsinchu) Jin-Tien (today) Zao-Shang (morning) Hei-Bu-Hei (will it) Xia-Yu (rain)?", which means "Will it rain in Hsinchu this morning?". Then, the speech recognition module in block S102 converts the utterance signal into a set of hypothetical sentences, named sentence list, and puts it into block S104. For example, the sentence list may include the sentences "Qing-Wen (tell me) Hsin-Chu (Hsinchu) Jin-Tien (today) Zao-Shang (morning) Hei-Bu-Hei (will it) Xia-Yu (rain)", "Qi-Wen (temperature) Hsin-Chu (Hsinchu) Jin-Tien (today) Zao-Shang (morning) Hei-Bu-Hei (will it) Xia-Yu (rain)?", and "Qing-Wen (tell me) Hsin-Chu (Hsinchu) Qing-Tien (sunny day) Zao-Shang (morning) Hei-Bu-Hei (will it) Xia-Yu (rain)".

In block S106, the sentence list is then analyzed by the language understanding module according to the linguistic knowledge and domain knowledge. The intention of the user's utterance can thus be determined and represented by a semantic frame in block S108.

In general, a natural language understanding system requires a predefined grammar to analyze and understand an input sequence. In the past, most natural language systems aimed at processing well-formed sentences that are grammatical with respect to the pre-defined grammars. If the input sentence is ill-formed (i.e., ungrammatical with respect to the predefined grammar), it is simply ignored. However, in real applications, ill-formed sentences are inevitable. Especially for a spoken dialogue system, the unpredictable errors of speech recognition usually make the hypothetical sentences erroneous.

To analyze ill-formed sentences, the robustness for parsing gradually evokes a great attention. The typical method is to partially parse the ill-formed sentence into recognizable pieces of phrases (i.e., partial parses), and select certain partial parses for further post-processing. In this approach, the system usually adopts some heuristic rules to select partial parses. Those rules are usually system-specific and, therefore, hard to re-use by other systems. In addition, since partial parsing does not recover the errors in an ill-formed sentence, this approach can only explore very limited information from the ill-formed sentence.

Another way to handle ill-formed sentences is to recover the errors in the sentences. In the past, this error recovery approach focused on searching the fittest parse tree among all alternatives that could be generated by the pre-defined system grammar. However, the system grammar, usually defined for analysis purpose, tends to be over-generated in many cases. That is, such approaches might produce sentences that are syntactically well-formed, but semantically meaningless. Furthermore, the number of structures which can be generated by the system grammar is generally too large to search exhaustively, some heuristic rules should be applied to reduce computation cost. However, those rules are usually system-specific and not easy to be re-used by other systems.

Recently, the concept-based approach is proposed to deal with the ill-formed sentences. In this approach, the system grammar only defines the structures of phrases, named concepts. A sentence is parsed into a sequence of concepts. For example, in FIG. 2, the sentence "Qing-Wen (tell me) Hsin-Chu (Hsinchu) Jin-Tien (today) Zao-Shang (morning) Hei-Bu-Hei (will it) Xia-Yu (rain)" is parsed into the concept sequence "Query Location Date Topic". Unlike conventional language analysis, the legitimacy of a concept sequence is not specified by grammar rules. Instead, the N-gram stochastic model is used to estimate the likelihood of a concept sequence.

Generally speaking, in the concept-based approach, the system grammar only specifies how to construct individual concept parse but does not give any constraints on how to assemble concepts to a concept sequence. All possible concept sequences of the hypothetical sentences are ranked by the N-gram stochastic model to choose the most probable concept sequence. This approach works well if the correct sentence is included in the hypothetical sentence set. However, due to the imperfect speech recognition technique, speech recognition errors are inevitable, especially for recognizing spontaneous speech. The hypothetical sentence set may not include the correct sentence. In such case, the language understanding module is forced to select one incorrect concept sequence to interpret the user's intention. For example, when the user says "Qing-Wen (tell me) Jin-Tien (today) Hsin-Chu (Hsinchu) Zao-Shang (morning) Hei-Bu-Hei (will it) Xia-Yu (rain)", the speech recognizer may only output two incorrect hypothetical sentences "Qi-Wen (temperature) Hsin-Chu (Hsinchu) Jin-Tien (today) Zao-Shang (morning) Hei-Bu-Hei (will it) Xia-Yu (rain)" and "Qing-Wen (tell me) Hsin-Chu (Hsinchu) Qing-Tien (sunny day) Hei-Bu-Hei (will it) Xia-Yu (rain)". In this case, the language understanding module can only select between two incorrect concept sequences of "Topic (Qi-Wen) Location (Hsin-Chu) Date (Jin-Tien Zao-Shang) Topic (Hei-Bu-Hei-Xia-Yu)" and "Query (Qing-Wen) Location (Hsin-Chu) Topic (Qing-Tien) Date (Zao-Shang) Topic (Hei-Bu-Hei-Xia-Yu)".

The problem of the above language understanding method comes from that the stochastic N-gram model can only provide the likelihood of a concept sequence but is not able to detect whether the concept sequence is correct or not, not even mentioning recover errors.

SUMMARY OF THE INVENTION

The invention provides a method for probabilistic error-tolerant natural language understanding. A database with correct concept sequence is constructed using text corpus. Using contradistinction, the error concept sequence is recovered. The process for the language understanding is oriented by a probabilistic scoring function. The scoring function integrates the information from the speech recognition and the knowledge encoded in the concept grammar and concept sequence examples to detect whether there is any error in speech recognition, and adopts the optimum method to recover the error whenever it occurs.

The above method of probabilistic error-tolerant natural language understanding comprises the following steps. The utterance spoken by the user is converted into a hypothetical word sequence set using speech recognition module. The hypothetical word sequence set is parsed into a concept parse forest set using concept grammar. Each concept parse forest includes a concept sequence, named hypothetical concept sequence. According to the concept parse forest set, hypothetical concept sequence set is constructed. This hypothetical concept sequence set is then compared with the set of exemplary concept sequences to find the most possible concept sequence. Finally, the concept sequences is converted into a semantic frame that represents the intention of the speaker.

The process of understanding the utterance of a user is expressed by a formula:

$$(\hat{W}, \hat{F}, \hat{C}, \hat{K}, \hat{E}) = \underset{(W,F,C,K,E)}{\operatorname{argmax}} \ P(W, F, C, K, E \mid U)$$

wherein U represents the utterance of the speaker. W represents one hypothetical word sequence output by the speech recognition module. F is one possible concept parse forest of the word sequence defined by the system grammar. The concept sequence C is the hypothetical concept sequence corresponding to the concept parse forest. K represents one exemplary concept sequence. E represents one edit operation sequence to change the exemplary concept sequence into the hypothetical concept sequence. $(\hat{W},\hat{F},\hat{C},\hat{K},\hat{E})$ represents an assemble of the most possible hypothetical word sequence, concept parse forest, hypothetical concept sequence, exemplary concept sequence and edit operation sequence for the utterance of the user.

In the method of probabilistic error-tolerant natural language understanding, the above probability formula can be replaced by scoring function:

$$(\hat{W}, \hat{F}, \hat{C}, \hat{K}, \hat{E}) = \underset{(W,F,C,K,E)}{\operatorname{argmax}} \ \{S_W + S_F + S_K + S_E\}$$

$S_W$ is called speech score, $S_F$ is called the grammar score, $S_K$ is called example score and $S_E$ represents the edit score. Due to the modeling errors caused by various assumptions and the estimation error caused by insufficient training data, different kinds of scores have different discrimination powers and reliabilities. To compensate this problem, the scores of different kinds of probability parameters are appropriately weighted with a positive weighing factor. Thus, during the process for understanding utterance of a user, the most possible hypothetical word sequence, concept parse forest, hypothetical concept sequence, exemplary concept sequence example and edit score are found in accordance with the scoring function $S(W,F,C,K,E) = w_1 \times S_W + w_2 \times S_F + w_3 \times S_K + w_4 \times S_E$. $w_1$ is the weight of speech score, $w_2$ is the weight of grammar score, $w_3$ is the weight of example score, $w_4$ is the weight of edit score.

Both the foregoing general description and the following detailed description are exemplary and explanatory only and are not restrictive of the invention, as claimed.

DESCRIPTION OF THE PREFERRED EMBODIMENTS

To determine whether there is any error for speech recognition, the embodiment designs a language understanding method including a database of concept sequence examples in addition to a grammar for parsing a sentence into concepts. The concept sequence example database is obtained by parsing the text corpus. Each example represents a legitimate concept sequence recognized by the system. System developers can directly add some legitimate concept sequences into the database to replenish the deficiency of the text corpus.

Thus, the process of understanding the utterance of a user is represented by the probability formula:

$$(\hat{W}, \hat{F}, \hat{C}, \hat{K}, \hat{E}) = \underset{(W,F,C,K,E)}{\operatorname{argmax}} \ P(W, F, C, K, E \mid U)$$

U is the articulation characteristics of the utterance of a user. W is one hypothetical word sequence output by the speech recognition module. F is one possible concept parse forest of W defined by system grammar. C is the corresponding hypothetical concept sequence of F. K is one exemplary concept sequence. E is one edit operation sequence to change the exemplary concept sequence to the hypothetical concept sequence. $(\hat{W},\hat{F},\hat{C},\hat{K},\hat{E})$ is a set of the most possible hypothetical word sequence, concept parse forest, hypothetical concept sequence, exemplary concept sequence and edit operation sequence with respective to the utterance of the user.

Figure 1:
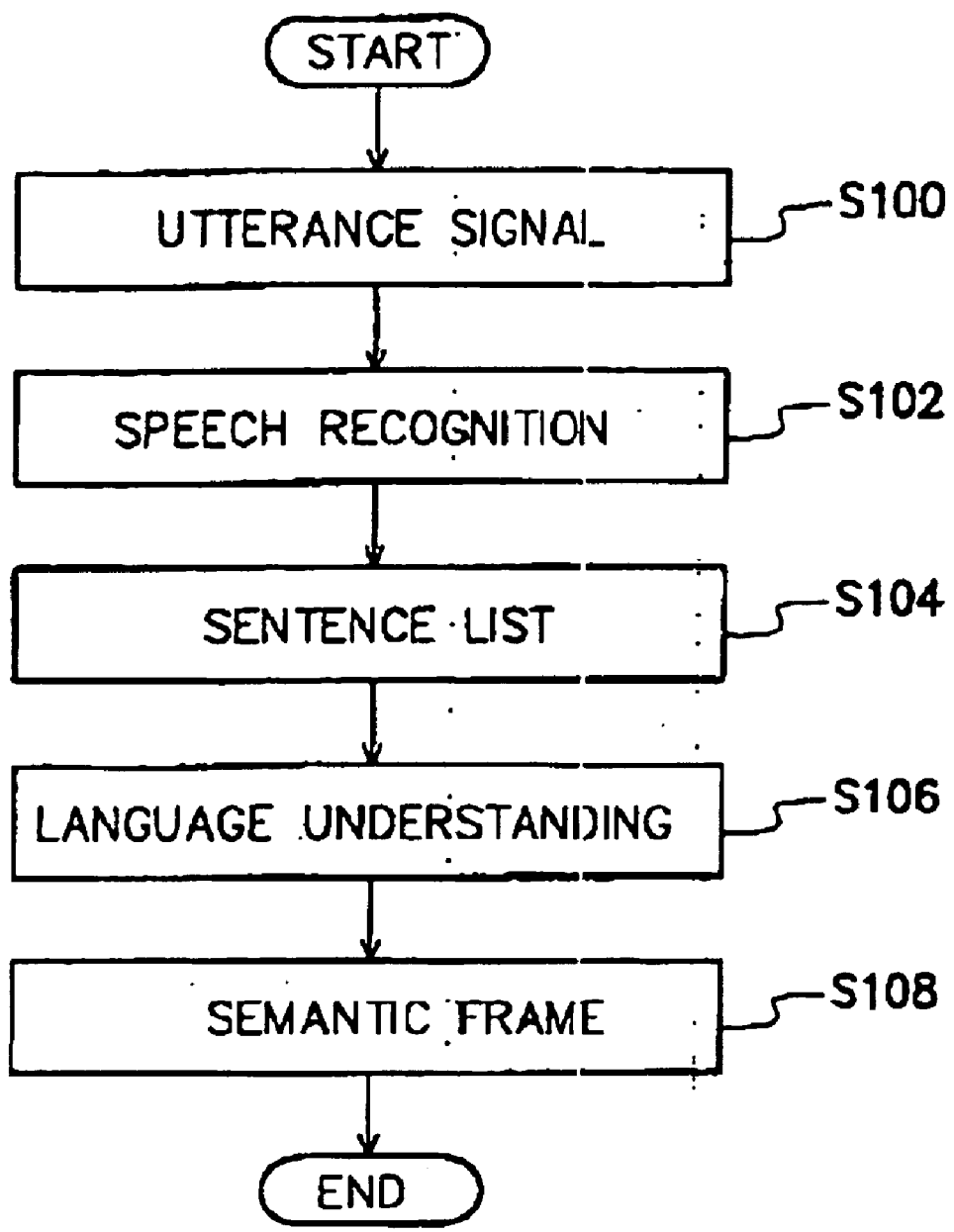
FIG. 1 is a flow chart for understanding the utterance of a user.
Figure 2:
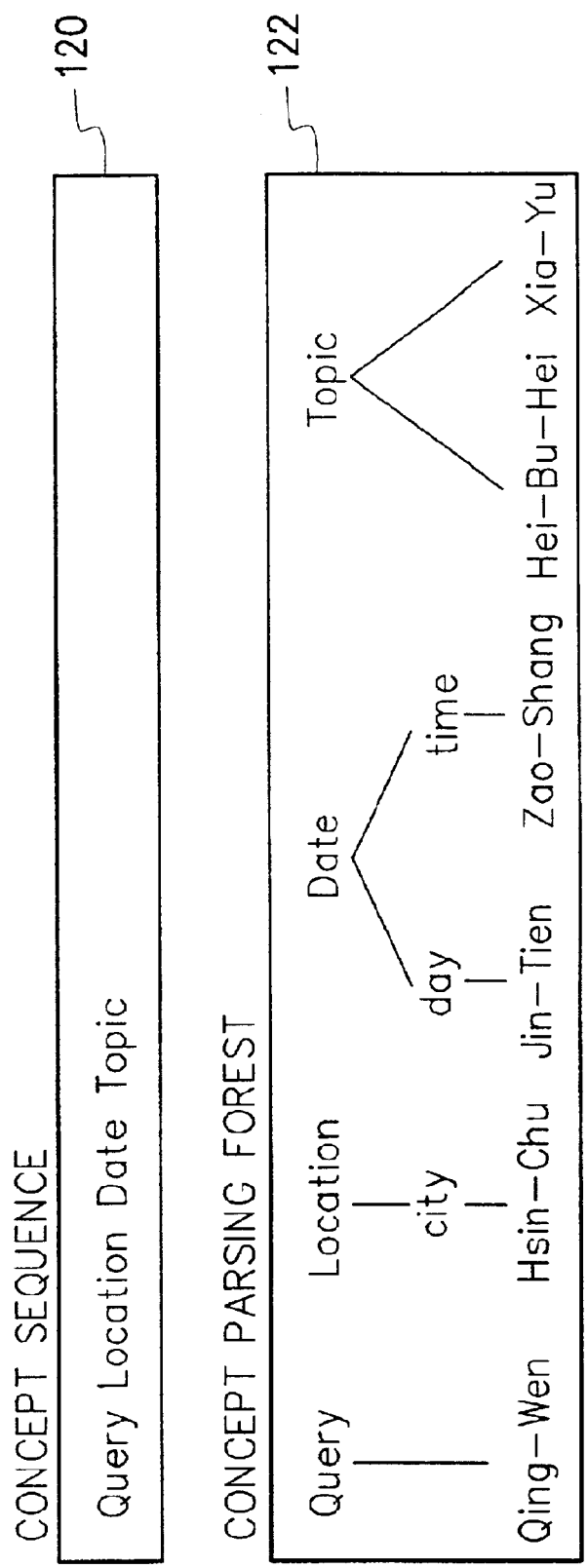
FIG. 2 shows the concept parse forest and the corresponding concept sequence.
Figure 3:
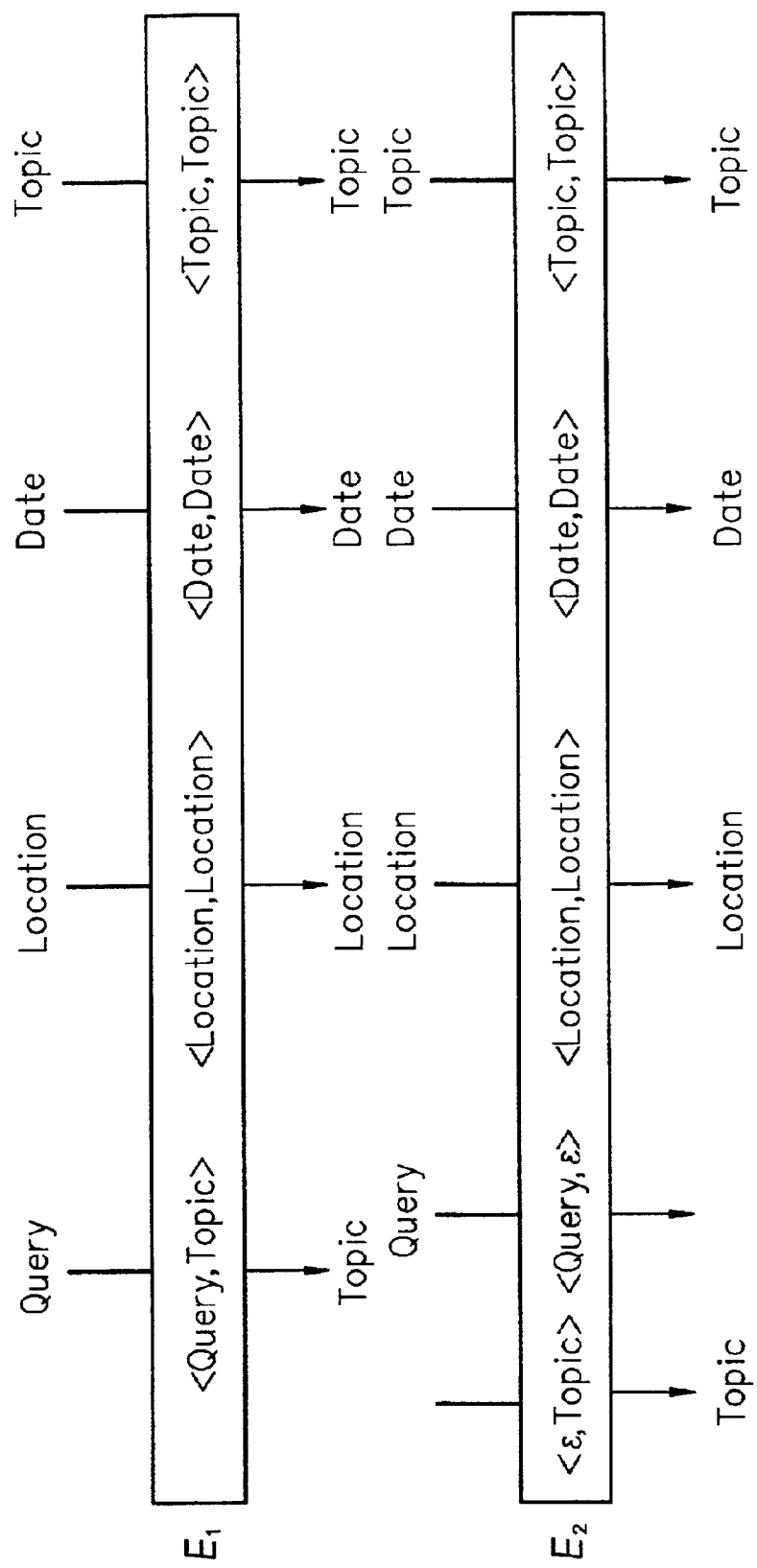
FIG. 3 shows two possible edit operation sequences for editing the concept sequence example "Query Location Date Topic" into "Topic Location Date Topic"

Table 1 shows the category of the edit operation of <x, y>. The edit operation sequence is constructed by various numbers of edit operations. The edit operation represented by <x, y> includes "insert", "delete", "substitute" and "accept". For example, FIG. 3 shows that the concept sequence example is edited from "Query Location Date Topic" into "Topic Location Date Topic". To edit "Query Location Date Topic" into "Topic Location Date Topic", "<Query, Topic><Location, Location><Date, Date><Topic, Topic>" and "<ε, Topic><Query, ε><Location, Location><Date, Date><Topic, Topic>" are two of the possible edit operation sequences. ε represents an empty object.

TABLE 1

| Condition | Operation | Operation Type |
|---|---|---|
| x = ε, y ≠ ε | Insert y | Insert |
| x ≠ ε, y = ε | Delete x | Delete |
| x ≠ ε, y ≠ ε, x ≠ y | Substitute x with y | Substitute |
| x ≠ ε, x = y | Accept | Accept |

In the probability formula, if $\hat{K}=\hat{C}$, $\hat{C}$ is the correct concept sequence recognized by the system that can construct a semantic frame. If $\hat{K} \neq \hat{C}$, it is determined that $\hat{C}$ is an incorrect concept sequence resulted from speech recognition errors and $\hat{K}$ is the correct concept sequence that the user want to express. In this case, the edit operation in $\hat{E}$ will be used to infer how to fix the errors in $\hat{C}$. In the probability formula, the probability term $P(W,F,C,K,E|U)$ can be further deduced as:

$$P(W, F, C, K, E \mid U) = P(F, C, K, E \mid W, U)P(W \mid U)$$

$$\approx P(F, C, K, E \mid W)P(W \mid U)$$

$$= \frac{P(W, F, C, K, E)}{P(W)} \frac{P(U \mid W)P(W)}{P(U)}$$

$$= \frac{P(W, F, C, K, E)P(U \mid W)}{P(U)}$$

In the above formula, we assume that $P(F,C,K,E|W,U) \approx P(F,C,K,E|W)$. Besides, since the probability term $P(U)$ is a constant, it can be ignored without changing the ranking order of alternatives. Therefore, only the probability term $P(U|W)$ and $P(W,F,C,K,E)$ need to be calculated.

The probability formula used for understanding utterance of the user can be edited as:

$$(\hat{W}, \hat{F}, \hat{C}, \hat{K}, \hat{E}) = \underset{(W,F,C,K,E)}{\text{argmax}} \ P(W, F, C, K, E)P(U \mid W)$$

$P(U|W)$ is the probability for obtaining the articulation characteristics U from the hypothetical word sequence W. The probability can be estimated using Hidden Markov Model or other methods in speech recognition. Only the probability term $P(W,F,C,K,E)$ need to be calculated in language understanding module.

Since the parameters of the probability term $P(W,F,C,K,E)$ are enormous and cannot be estimated directly, it is simplified as:

$$P(W, F, C, K, E) = P(W, F \mid C, K, E)P(C, E \mid K)P(K)$$

$$\approx P(W, F \mid C)P(C, E \mid K)P(K)$$

$$= P(F \mid C)P(E \mid K)P(K)$$

In the above formula, we assume that $P(W,F|C,K,E) \approx P(W,F|C)$. In addition, as the terminal of the concept parse forest is the word sequence W, $P(W,F|C)=P(F|C)$. Similarly, as the edit operation sequence includes information of the consequence sequence C, the probability term: $P(C,E|K)=P(E|K)$.

The probability term $P(F|C)$ can be estimated using SCFG (stochastic context-free grammar) model as:

$$P(F \mid C) = \prod_{T \in F, A \to \alpha \in T} P(\alpha \mid A).$$

T is a concept parse tree. $A \to \alpha$ is one of the production rules that assemble T. A is the left-hand-side symbol. α is the right-hand-side symbols.

The probability term $P(K)$ can be estimated by N-gram probability model as:

$$P(K = k_1^m) = \sum_{i=1}^{m} P(k_i \mid k_1^{i-1}) \approx \sum_{i=1}^{m} P(k_i \mid k_{i-N+1}^{i-1})$$

wherein m is the number of concepts in K, $k_i$ is the i-th concept, and $k_1^m$ represents $k_1, \ldots, k_m$.

The probability term $P(E|K)$ can be simplified as:

$$P(E = e_1^n \mid K = k_1^m) = \prod_{i=1}^{n} P(e_i \mid e_1^{i-1}, k_1^m)$$

$$\approx \prod P(e_i \mid k_1^m)$$

$$\approx \prod P\left(e_i \mid k_{L(e_i)-X+1}^{L(e_i)}, k_{R(e_i)}^{R(e_i)+Y-1}\right)$$

n is the number of the edit operations in E. $e_i$ is the i-th edit operation. $L(e_i)$ is the position of the concept left adjacent to $e_i$ in the exemplary concept sequence K. Similarly, $R(e_i)$ is the position of concept right adjacent to $e_i$ in the exemplary concept sequence K. $k_{L(e_i)-X+1}^{L(e_i)}$ denotes the X concepts in the concept sequence example K at the left hand side of $e_i$. $k_{R(e_i)}^{R(e_i)+Y-1}$ denotes the Y concepts in the concept sequence example K at the right hand side of $e_i$.

In the process of understanding the utterance of the user, the probability formula is edited as:

$$(\hat{W}, \hat{F}, \hat{C}, \hat{K}, \hat{E}) = \underset{(W,F,C,K,E)}{\text{argmax}} \ \log \Bigg\{ P(U \mid W) \times \prod_{T \in F, A \to \alpha \in T} P(\alpha \mid A) \times$$

$$\prod_{i=1}^{m} P(k_i \mid k_{i-N+1}^{i-1}) \times \prod_{i=1}^{n} P\left(e_i \mid k_{L(e_i)-X+1}^{L(e_i)}, k_{R(e_i)}^{R(e_i)+Y-1}\right) \Bigg\} =$$

$$\underset{(W,F,C,K,E)}{\text{argmax}} \ \{S_W + S_F + S_K + S_E\}$$

$S_W = \log P(U|W)$ is called speech score.

$$S_F = \sum_{T \in F, A \to \alpha \in T} \log P(\alpha \mid A)$$

is called grammar score.

$$S_k = \sum_{i=1}^{m} \log P(k_1 \mid k_{i-N+1}^{i-1})$$

is called example score.

$$S_E = \sum_{i=1}^{n} \log P\left(e_i \mid k_{L(e_i)-X+1}^{L(e_i)}, k_{R(e_i)}^{R(e_i)+Y-1}\right)$$

is called edit score. However, due to the modeling error caused by various assumptions and the estimation error caused by insufficient training data, different kinds of probability parameters have different discrimination powers and reliabilities. To resolve this problem, different weights are added to different kinds of probability parameters. Therefore, during the process of understanding the utterance of a user, the most possible word sequence, concept parse forest, hypothetical concept sequence, exemplary concept sequence and edit operation sequence are found in accordance with the scoring function: $S(W,F,C,K,E)=w_1 \times S_W + w_2 \times S_F + w_3 \times S_K + w_4 \times S_E$. $w_1$ is the weight of speech score. $w_2$ is the weight of grammar score. $w_3$ is the weight of example score. $w_4$ is the weight of edit score. The above weights are positive.

The above parameters N, X and Y can be determined by the amount of training data. Typically, for the concept score, N=2 is a good choice. However, the training data is usually not enough to reliably estimate the parameters of the edit score, even using the setting of X=0, Y=0. In such case, the category of edit operation can be used to replace the edit operation itself, that is, using the following formula to estimate the probability term.

$$P(E = e_1^n \mid K = k_1^m) = \prod_{i=1}^{n} P(f(e_i))$$

where $f((e_i))$ denotes the operation category of $e_i$. In other words, when the training data is insufficient, the concept score and the edit score are defined as:

$$S_K = \sum_{i=1}^{m} \log p(k_i \mid k_{i-1})$$

$$S_E = \sum_{i=1}^{n} \log P(f(e_i))$$

Figure 4:
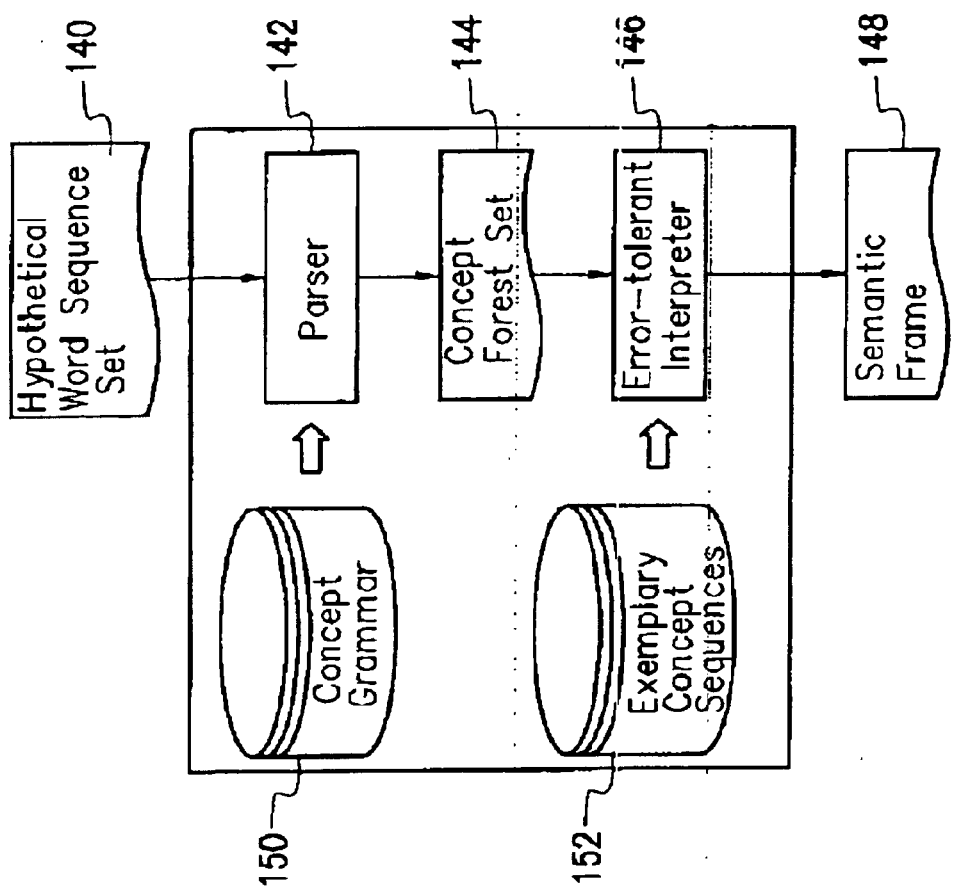
FIG. 4 shows a block diagram of the method of probabilistic error-tolerant language understanding.
Figure 5:
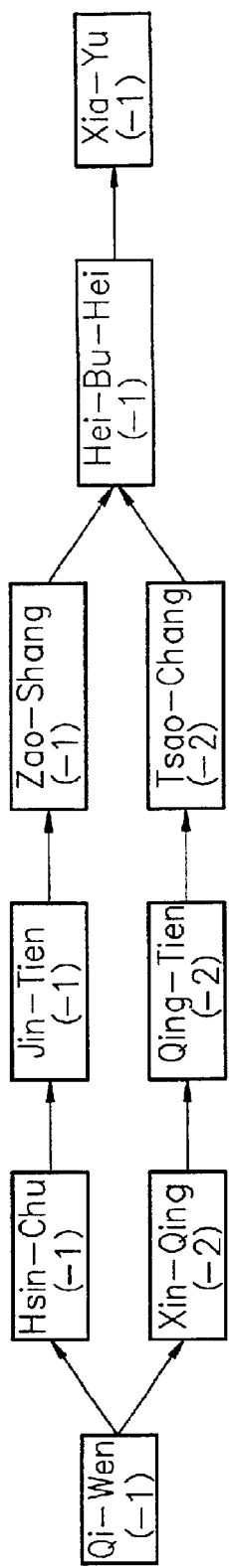
FIG. 5 shows a graph of hypothetical word sequences.

FIG. 4 shows a block diagram illustrating the method of probabilistic error-tolerant language understanding. A word sequence set 140 is formed after speech recognizing the utterance of a user. The word sequence set 140 can be expressed as sentence list or word graph. For explanatory convenience, we use a word graph to represent the word sequence set. Each word w in the word graph is attached with a word score by the speech recognizer. FIG. 5 shows the speech scores of various words in the word graph. Therefore, for a word sequence W, the speech score $S_W$ is computed as the sum of the word scores of all the words in W. For example, in FIG. 5, every word in the word sequence "Qi-Wen Hsin-Chu Jin-Tien Zao-Shang Hei-Bu-Hei Xia-Yu" is attached with a word score −1 by the speech recognizer. Then, the speech score of the word sequence is −6.

In FIG. 4, the parser in block 142 is responsible for parsing the word sequence set 140 into the concept parse forest set 144 according to a context-free grammar, called the concept grammar 150. In the concept grammar 150, each non-terminal symbol represents one concept, for example, Query, Location, Date or Topic.

Figure 6:
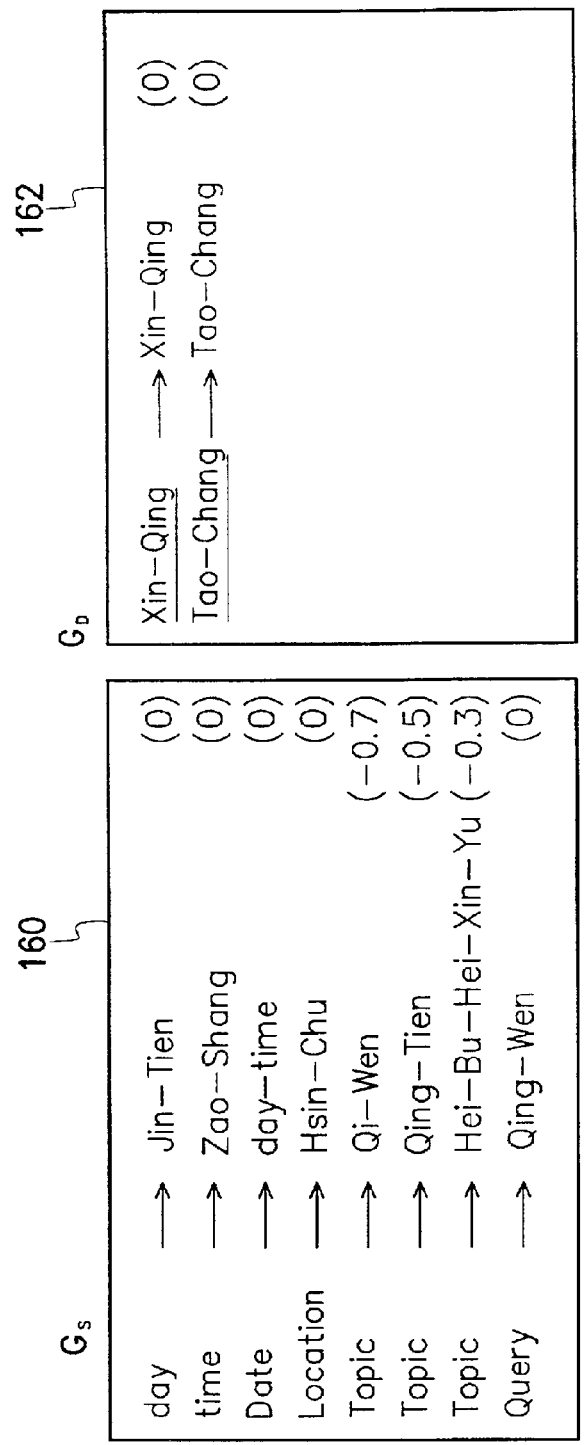
FIG. 6 shows the static grammar and the dynamic grammar.

FIG. 6 shows the static and dynamic grammars. The concept grammar is divided into the static grammar 160 (denoted as $G_S$) and the dynamic grammar 162 (denoted as $G_D$). The static grammar 160 contains some predefined production rules. The dynamic grammar 162 contains the production rules dynamically generated by comparing the word sequence set 140 to the static grammar 160 as follows.

$$G_D = \{\underline{w} \to w \mid w \in I, A \to w \notin G_S\}$$

I is the input word sequence set. A is any non-terminal symbol of $G_S$. $\underline{w}$ is the non-terminal symbol dynamically formed (to represent the concept of the word w). For example, "Xin-Qing" is a dynamically nonterminal and "Xin-Qing→Xin-Qing" is a dynamically generated production rule. The probability $P(w|\underline{w})$ of each rule $\underline{w} \to w$ in dynamic grammar 162 is set as 1. The dynamic grammar 162 is to make up the insufficiency of the static grammar 160, to avoid that any word can not be a part of a concept phrase.

Figure 7:
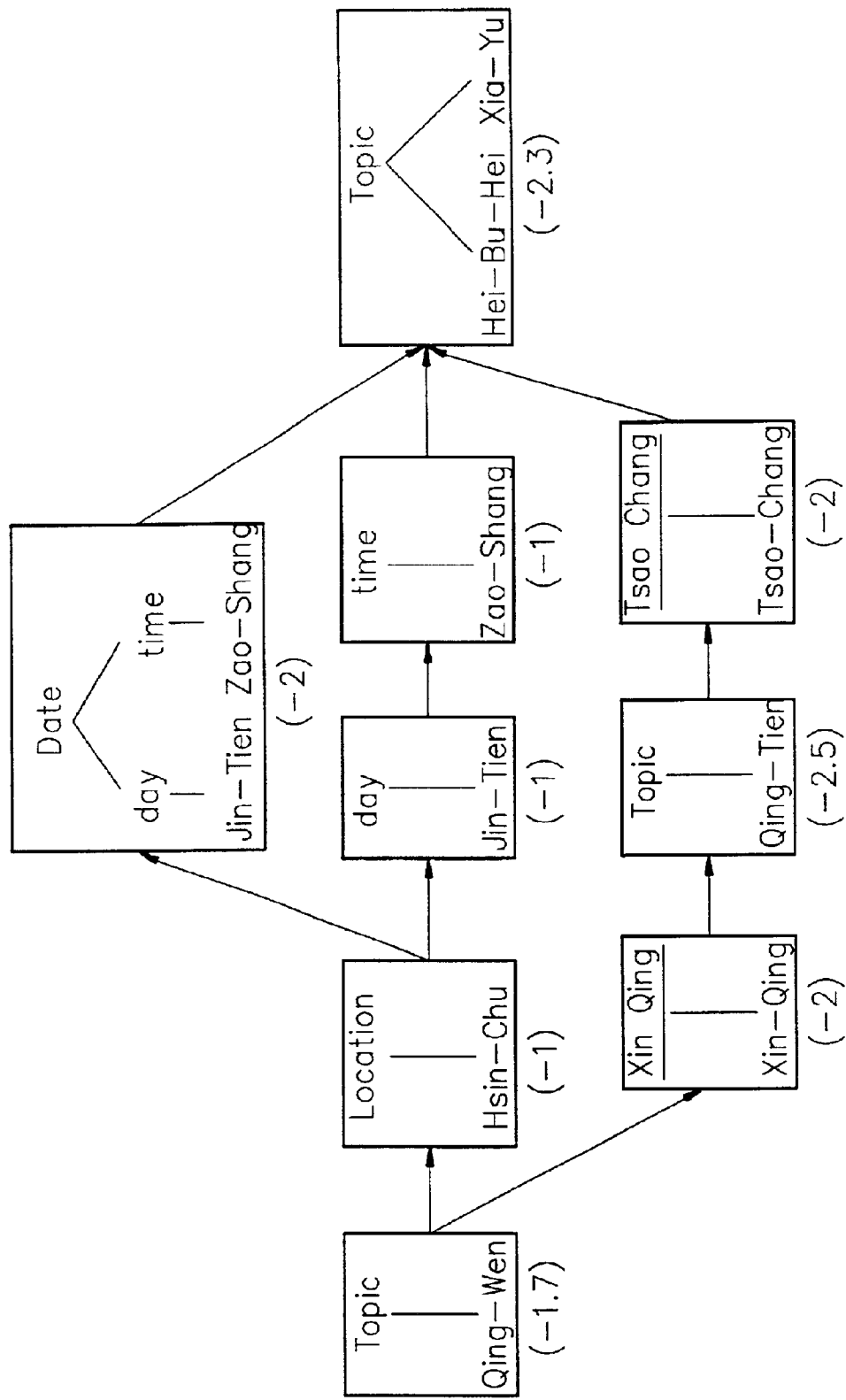
FIG. 7 shows a concept parse forest set represented by a graph.

FIG. 7 shows an example of a concept parse forest set represented by a graph. Each box in FIG. 7 is a concept parse tree and is attached with a score computed as follows.

$$w_1 \times \sum_{w \in T} S_w + w_2 \times \sum_{A \to \alpha \in T} \log P(\alpha \mid A) = w_1 \times \sum_{w \in T} S_w + w_2 \times \sum_{A \to \alpha \in T} S_{A \to \alpha}$$

Wherein:

$S_w$ is the word score of a word w belonging to the concept parse tree T and ($S_{A \to \alpha} = \log P(\alpha|A)$ represents the score of production rule $A \to \alpha$. In FIG. 7, the score inside of the bracket is the score of each concept parse tree under the condition of setting the weight as: $w_1 = w_2 = 1$.

In FIG. 4, the error-tolerant interpreter 146 compares the exemplary concept sequences 152 to the hypothetical concept sequences included by the concept parse forest set 144, and then, finds the most probable hypothetical concept sequence, exemplary concept sequence and edit sequence to construct the semantic frame 148 that represents the intention of the user. The exemplary concept sequences are collected from parsing a text corpus. In addition, the exemplary concept sequences can also contain the legitimate concept sequences provided by system developers.

Figure 8:
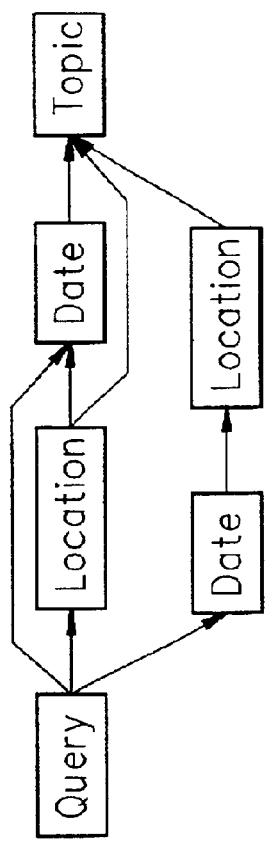
FIG. 8 shows a graph of exemplary concept sequences.

FIG. 8 shows a directed acyclic graph, called exemplary concept graph. This graph consists of four exemplary concept sequences, such as "Query Location Date Topic" or "Query Date Location Topic". In addition to the graph representation form, the concept sequence examples can also be organized as a list or a tree. However, the graph representation form is more compact in storage size and more efficient in comparing sequences.

Figure 9:
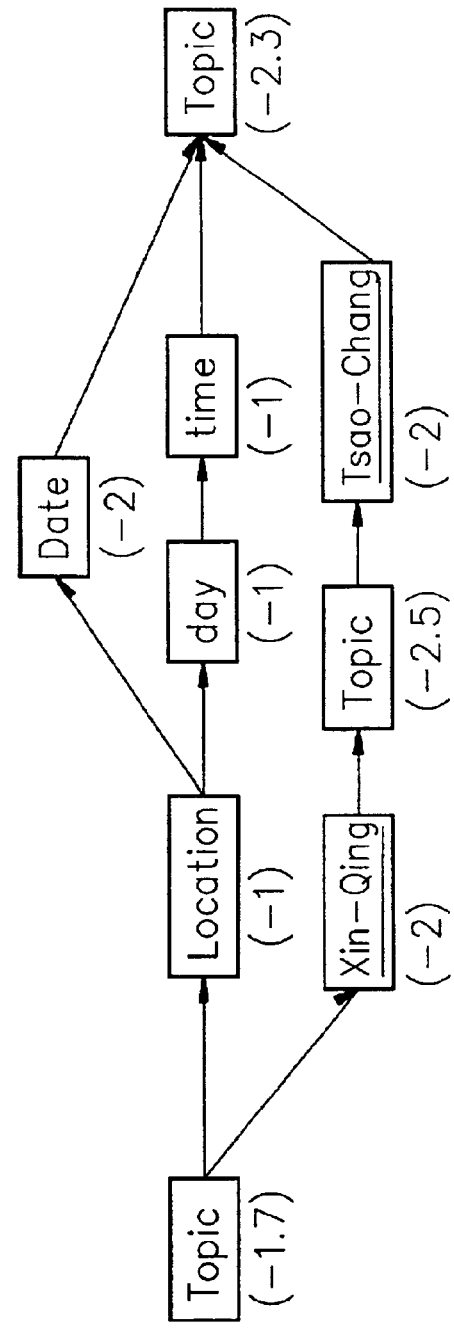
FIG. 9 shows the hypothetical concept sequences according to concept parse forest set.

FIG. 9 shows a concept graph, called hypothetical concept graph. This graph is constructed according to the concept parse forest set. Each node in this graph is linked to a concept parse tree in FIG. 7 and is attached with the score of the linked concept parse tree.

The method of directed network comparison (Kruskal, J. B., and D. Sankoff, "An anthology of algorithms and concepts for sequence comparison" in Time Warps, String Edits, and Macromolecules: The Theory and Practice Sequence Comparison, D. Sankoff and J. B. Kruskal (Eds.), Addison-Wesley Publishing Company, 1983, pp. 265–310) can be used to efficiently compare sequences in the exemplary and hypothetical concept graphs. The selected scoring function is used as the standard for distance measure. The most matched pair of hypothetical concept sequence and exemplary concept sequence is selected out of the graphs. These two sequences and their corresponding edit operation sequence are the most possible hypothetical concept sequence, exemplary concept sequence and edit operation sequence for the user's utterance.

Figure 10:
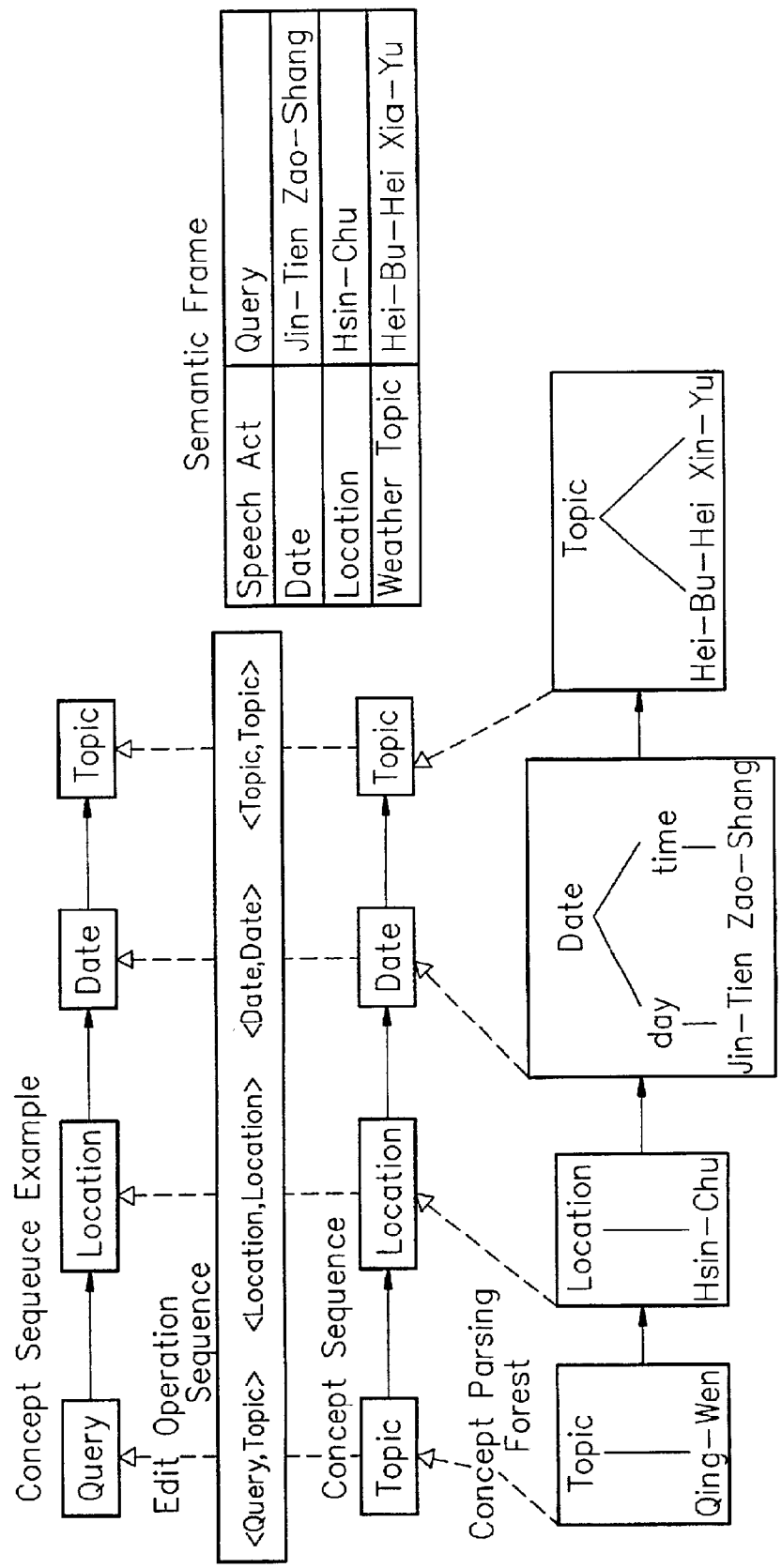
FIG. 10 shows a semantic frame constructed by an interpreter via comparing the hypothetical concept sequence and the exemplary concept sequence.

FIG. 10 shows the semantic frame constructed by the interpreter according to the most possible hypothetical concept sequence, exemplary concept sequence and edit operation sequence. For example, assuming that the exemplary concept graph in FIG. 8 is compared to the hypothetical concept graph in FIG. 9, the most possible exemplary concept sequence and edit operation sequence are "Query Location Date Topic" and "<Query, Topic><Location, Location><Date, Date><Topic, Topic>", respectively, as shown in FIG. 10. The interpreter can thus determines the concept sequence that the user wants to express is "Query Location Date Topic and tries to edit the concept parse forest linked to the most possible hypothetical concept sequence "Topic Location Date Topic", so as to construct the semantic frame.

The performance of speech recognition using the probabilistic error-tolerant language understanding method (called ET model hereinafter) is inspected by comparing with the concept-bigram (called CB model hereinafter) applied in normal system. The CB model selects concept sequence according to the following scoring function:

$$S(W, F, C) \equiv w_1 \times \log\{P(U \mid W)\} + w_2 \times \log\left\{\prod_{A \to \alpha \in F} P(\alpha \mid A)\right\} + w_3 \times \log\left\{\prod_{i=1}^{n} P(c_i \mid c_{i-1})\right\}$$

wherein $c_i$ is the i-th concept of C. The ET model provided by the invention uses $S(W,F,C,K,E)=w_1 \times S_W + w_2 \times S_F + w_3 \times S_K + w_4 \times S_E$, where $$S_K = \sum_{i=1}^{m} \log p(k_i \mid k_{i-1})$$

and $$S_E = \sum_{i=1}^{n} \log P(f(e_i))$$

as the scoring functions which explores the information provided by the speech recognition, concept grammar and exemplary concept sequences.

Using a Chinese spoken dialogue system for weather information as a test bed, the above two different language understanding models are embedded into the system. A total of 422 utterances of users requests are used for testing. To clearly recognize the performance of handling error sentence for speech recognition by the invention, whether the error-tolerant model observes the speech recognition error is used as a reference to divide the testing utterances into the well-formed set and the ill-formed set. For each utterance in well-formed set, at least one word sequence in the word graph provided by the speech recognizer can be parsed into a legitimate concept sequence (i.e., a concept sequence exactly matches one of exemplary concept sequences). On the contrary, for each utterance in the ill-formed set, none of the word sequence in the word-graph provided by the speech recognizer can be parsed into a legitimate concept sequence.

Among the 422 test utterance, there are 288 well-formed set (68% overall), and 134 ill-formed wet (32% overall). For the well-formed testing set, the ET model behaves like the CB model. This is because the ET model determines that no speech recognition error is mixed in the most probable hypothetical concept sequence. Both models achieve 98.8% precision rate and 96.0% recall rate of semantic slots.

However, for the ill-formed set, ET model and CB model have different performances. Table 2 shows the performances of the CB model and ET model. Based on the 134 utterances in the ill-formed testing set, in ET model, both the precision and recall rates are improved greatly. With the error reduction rate as the reference to measure the improvement of performance, the ET model in the embodiment provides 40.3% and 25.4% of the improvements for precision and recall rates.

TABLE 2

| Condition | Precision | Recall |
| --- | --- | --- |
| CB Model (Prior Art) | 73.0% | 60.1% |
| ET Model (The Invention) | 83.9% | 70.2% |
| Improvement | 40.3% | 25.4% |

Thus, the invention includes at least the advantage of constructing a correct concept sequence database using text corpus. By way of comparison, the error concept sequence is edited. The whole process for language understanding is guided by a probability oriented scoring function. The scoring function integrates the information from speech recognition, concept grammar knowledge and exemplary concept sequence example knowledge to detect whether there are errors for speech recognition, and finds the best editing method when errors are detected.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method of probabilistic error-tolerant natural language understanding, comprising:

using a speech recognition to convert an utterance of a user into a possible word sequence set;

dividing a concept grammar into a static grammar and a dynamic grammar, wherein the static grammar is predetermined and is not variable according to the input word sequence set, while the dynamic grammar is formed by comparing the input word sequence set and the static grammar;

using the concept grammar to parse the word sequence set into a concept parse forest, wherein the concept parse forest further comprises at least one hypothetical concept sequence;

using at least one exemplary concept sequence to represent the concept sequence which is well-formed being recognized by the concept grammar; and comparing the hypothetical concept sequences and the exemplary concept sequences to find the most possible concept sequence, and to convert the concept sequence into a semantic frame expressing intention of the user, wherein a probability based on characteristics of speech, grammar, example, and edit is used to find the most possible concept sequence.

2. The method according to claim 1, wherein:

the process for understanding the utterance of the user using the method of probabilistic error-tolerant natural language understanding is presented by a probability formula as:

$$(\hat{W}, \hat{F}, \hat{C}, \hat{K}, \hat{E}) = \operatorname*{argmax}_{(W,F,C,K,E)} P(W, F, C, K, E \mid U)$$

U representing an articulation characteristic of the utterance of the user;

W being one possible word sequence in the word sequence set output by the speech recognition module;

F being one possible concept parse forest defined by a system grammar;

C being a hypothetical concept sequence corresponding to the concept parse forest;

K being the exemplary concept sequence;

E being one edit operation sequence to change the exemplary concept sequence to the hypothetical concept sequence; and $(\hat{W},\hat{F},\hat{C},\hat{K},\hat{E})$ being a most possible assemble of the word sequence, the concept parse forest, the hypothetical concept sequence, the exemplary concept sequence and the edit operation sequence; and the process for understanding the utterance of the user using the method of probabilistic error-tolerant natural language understanding is probability oriented to use a scoring function to replace the probability formula as;

$$(\hat{W}, \hat{F}, \hat{C}, \hat{K}, \hat{E}) = \underset{(W,F,C,K,E)}{\operatorname{argmax}} \{S_W + S_F + S_K + S_E\}$$

$S_W$ being a speech score;
$S_F$ being a grammar score;
$S_K$ being an example score; and
$S_E$ being an edit operation score;

weights larger than zero are given to different probability parameters to find the most possible word sequence, the concept parse forest, the hypothetical concept sequence, the exemplary concept sequence and the edit operation according to:

$$S(W,F,C,K,E) = w_1 \times S_W + w_2 \times S_F + w_3 \times S_K + w_4 \times S_E$$

$w_1$ being a weight of speech score;
$w_2$ being a weight of grammar score;
$w_3$ being a weight of example score; and
$w_4$ being a weight of edit operation score.

3. The method according to claim 2, wherein the first term of the probability term P(W,F,C,K,E|U) can be further deduced as:

$$P(W, F, C, K, E \mid U) = P(E, C, K, E \mid W, U)P(W \mid U)$$
$$\approx P(F, C, K, E \mid W)P(W \mid U)$$
$$= \frac{P(W, F, C, K, E)}{P(W)} \frac{P(U \mid W)P(W)}{P(U)}$$
$$= \frac{P(W, F, C, K, E)P(U \mid W)}{P(U)}$$

wherein P(F,C,K,E|W,U)≈P(F,C,K,E|W), a relationship between the concept parse forest, the hypothetical concept sequence, the exemplary concept sequence, the edit operation sequence and the articulation characteristics can be neglected when the word sequence is given.

4. The method according to claim 3, wherein the speech recognition uses a statistical model to estimate the second probability P(U|W) in the first probability term P(W,F,C,K,E|U).

5. The method according to claim 3, wherein the third probability term P(W,F,C,K,E) in the first probability term P(W,F,C,K,E|U) is simplified as:

$$P(W, F, C, K, E) = P(W, F \mid C, K, E)P(C, E \mid K)P(K)$$
$$\approx P(W, F \mid C)P(C, E \mid K)P(K)$$
$$= P(F \mid C)P(E \mid K)P(K)$$

wherein the fourth probability term P(W,F|C,K,E) and the fifth probability term P(W,F|C) are assumed as: P(W,F|C,K,E)≈P(W,F|C).

6. The method according to claim 5, wherein the fifth probability term P(W,F|C) and the sixth probability term P(F|C) are equal to each other since one terminal node sequence of the concept parse forest is the word sequence.

7. The method according to claim 6, wherein when the word sequence set is parsed by using a SCFG probability model, the sixth probability term P(F|C) is estimated by:

$$P(F \mid C) \approx \prod_{T \in F, A \to \alpha \in T} P(\alpha \mid A),$$

wherein T represents one concept parse tree, A→α is a production rule to assemble the concept parse forest, A is a left-hand-side symbol, and α are right-hand-side symbols.

8. The method according to claim 5, wherein the seventh probability term P(C,E|K) and the eighth probability term P(E|K) of the third probability term P(W,F,C,K,E) are equal to each other due to information of the concept sequence included by the edit operation sequence.

9. The method according to claim 8, wherein the eighth probability term P(E|K) can be simplified as:

$$P(E = e_1^n \mid K = k_l^m) = \prod_{i=1}^{n} (e_i \mid e_1^{i-1}, k_l^m)$$
$$\approx \prod_{i=1}^{n} P(e_i \mid = k_1^m)$$
$$\approx \prod_{i=1}^{n} P\left(e_i \mid k_{L(e_i)-X+1}^{L(e_i)}, k_{R(e_i)}^{R(e_i)+Y-1}\right)$$

wherein:

n represents the number of the edit operations of the edit operation sequence;

$e_i$ represents the ith edit operation;

$L(e_i)$ represents a concept position of the exemplary concept, which is left adjacent to $e_i$;

$k_{L(e_i)}$ represents the left-hand-side concept adjacent to $e_i$;

$R(e_i)$ represents the concept position of the exemplary concept, which is right adjacent to $e_i$;

$$k_{L(e_i)-X+1}^{L(e_i)}$$

is the X exemplary concepts located at left hand side of $e_i$; and $$k_{R(e_i)}^{R(e_i)+Y-1}$$

is the Y exemplary concepts located at the right hand side of $e_i$.

10. The method according to claim 5, wherein the ninth probability term P(K) of the third probability term P(W,F,C,K,E) is estimated by N-gram probability model as:

$$P(K = k_1^m) = \prod_{i=1}^{m} P(k_i \mid k_1^{i-1}) \approx \prod_{i=1}^{m} P(k_i \mid k_{i-N+1}^{i-1}),$$

wherein m is the concept number of the exemplary concept sequence, $k_i$ is the ith concept, and $k_l^m$ represent $k_l, \ldots, k_m$.

11. The method according to claim 2, wherein the scoring function including the following scores to be estimated as:
$S_W$=log P(U|W) for the speech score;

$$S_F = \sum_{T \in F, A \to \alpha \in T} \log P(\alpha \mid A)$$

for the grammar score;

$$S_K = \sum_{i=1}^{m} \log p(k_i \mid k_{i-N+1}^{i-1})$$

for the example score; and $$S_E = \sum_{i=1}^{n} P\left(e_i \mid k_{L(e_i)-X+1}^{L(e_1)}, k_{R(e_i)}^{R(e_i)+Y-1}\right)$$

for the edit score.

12. The method according to claim 11, wherein when training data is insufficient, the example score is defined as $$S_K = \sum_{i=1}^{m} \log p(k_i \mid k_{i-1}),$$

and the edit score is defined as $$S_E = \sum_{i=1}^{n} \log P(f(e_i)),$$

wherein f($e_i$) represents one operation assortment function.

13. The method according to claim 1, wherein the word sequence set is represented by either a sentence list or a word graph.

14. The method according to claim 1, wherein a correctness of a concept sequence example database is constructed by the exemplary concept sequence can be parsed and confirmed by the user's judgement, and the well-formed concept sequence defined by the user can also be added to make up insufficiency of a text corpus.

* * * * *